(No Model.) 2 Sheets—Sheet 1.
W. A. KNOWLES.
DENTAL ENGINE.
No. 385,812. Patented July 10, 1888.
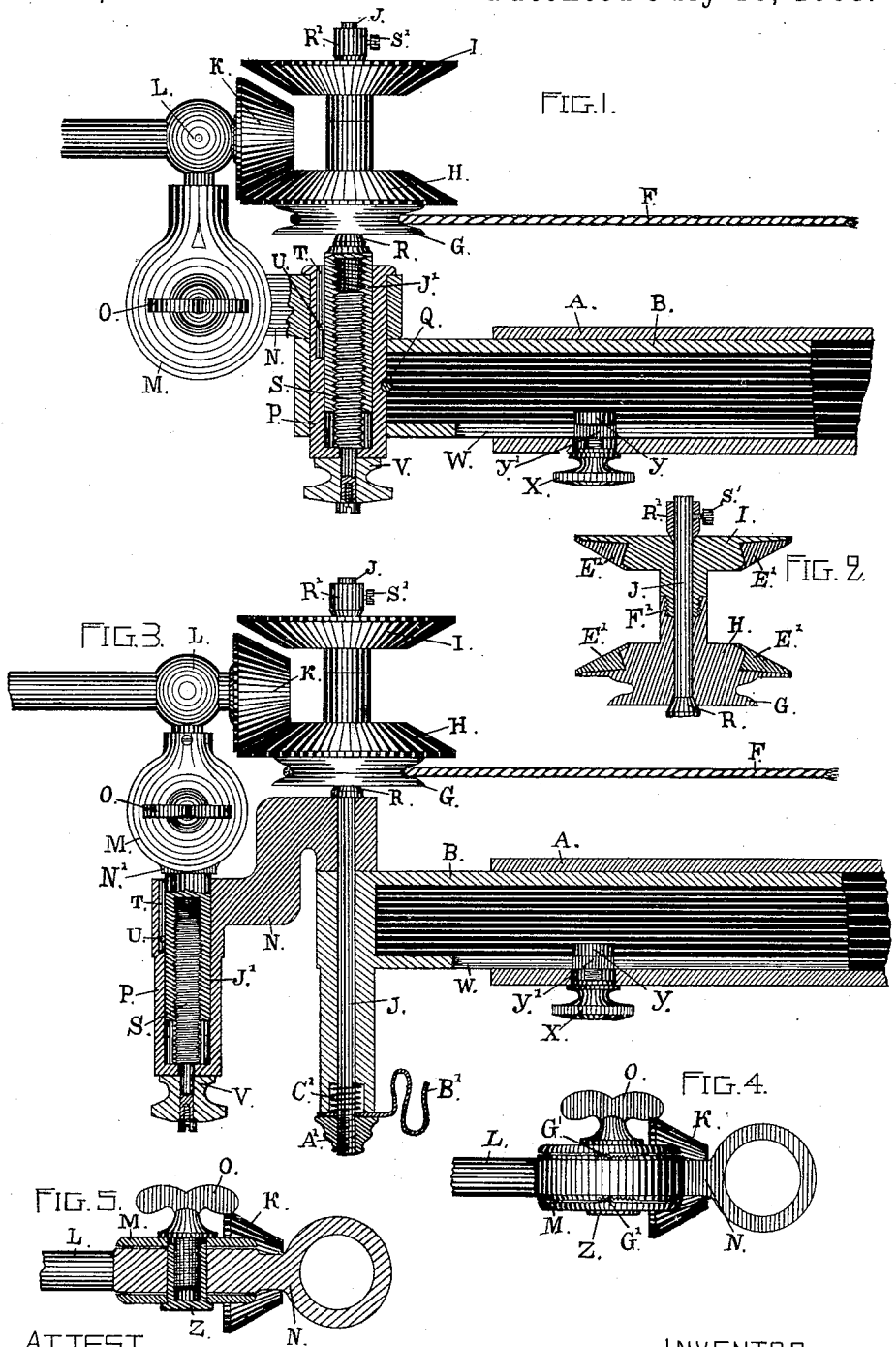
ATTEST,
John H. Redstone.
L. E. Redstone.
INVENTOR,
William A. Knowles (No Model.) 2 Sheets—Sheet 2.
W. A. KNOWLES.
DENTAL ENGINE.
No. 385,812. Patented July 10, 1888.
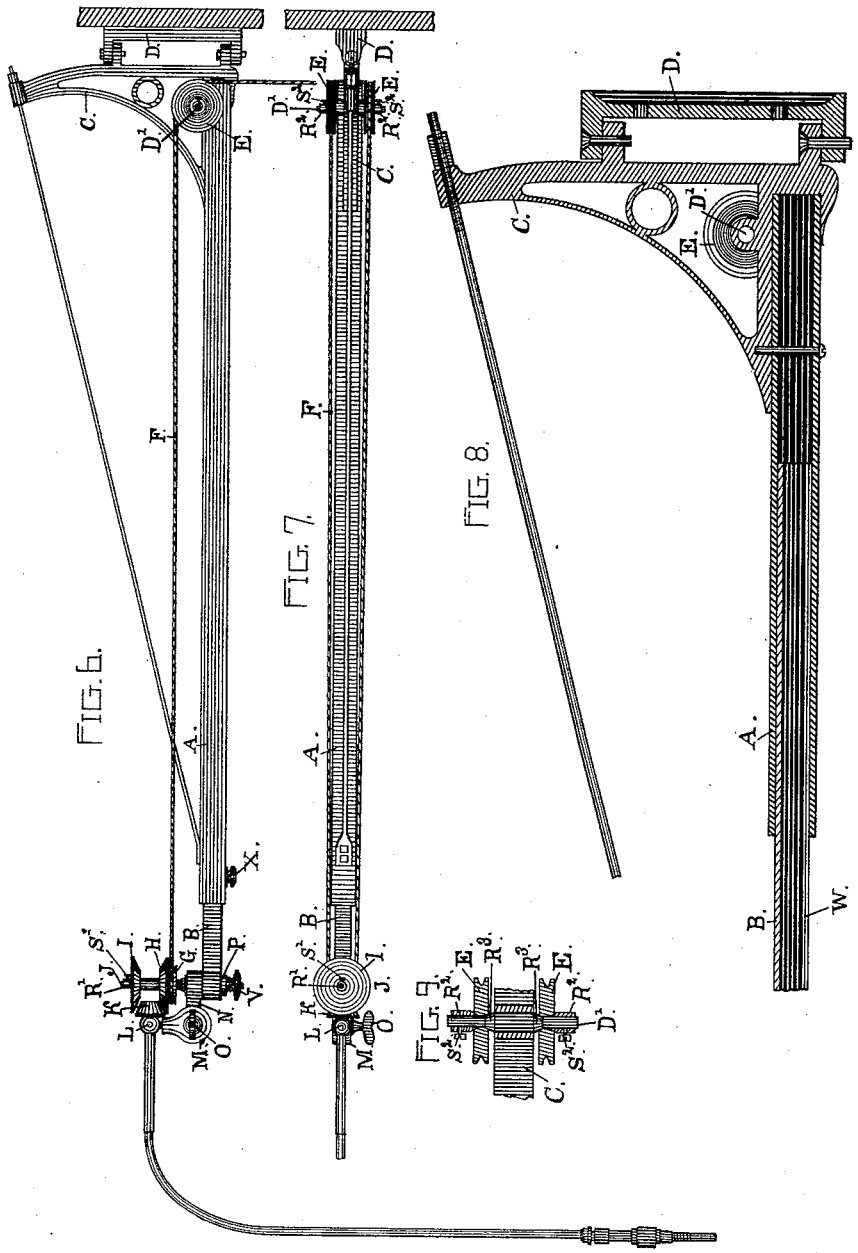
ATTEST,
John H. Redstone.
L. E. Redstone.
INVENTOR,
William A. Knowles.

United States Patent Office.

WILLIAM A. KNOWLES, OF ALAMEDA, CALIFORNIA.

DENTAL ENGINE.

SPECIFICATION forming part of Letters Patent No. 385,812, dated July 10, 1388.

Application filed August 18, 1887. Serial No. 247,234. (No model.)

*To all whom it may concern:*

Be it known that I, WILLIAM A. KNOWLES, a citizen of the United States, residing in the city and county of Alameda, and State of California, have invented a new and useful Dental Engine, of which the following is a specification.

My invention relates to improvements in dental engines, which will be understood by reference to the accompanying drawings and the letters referring thereto.

Figure 1 is a side elevation, partly in section; Fig. 2, a broken sectional view of the pulley; Fig. 3, a side elevation, partly in section; Fig. 4, an under plan view of the tip-down and bracket lever; Fig. 5, a sectional view of the tip-down; Fig. 6, a longitudinal section of the crane as a whole; Fig. 7, a plan view of the same; Fig. 8, a broken section, and Fig. 9 a broken sectional view, of the training-pulleys.

A represents the crane-arm; B, the extension-arm; C, the bracket which supports the crane-arm; D, the hanger to which the bracket-crane is hinged; D', the pulley-journal for the training-pulleys; E, the training-pulleys; R³, the conical bearings formed upon the shaft or journal-rod D'; R², the adjustable cone-journals, which are set upon the shaft D' by means of the screws S².

The same device is referred to by the same letters where it is employed in the different applications and figures.

F represents the driving-cord which drives the pulley G; G, the driving-pulley attached to the wheel H; H, the lower beveled driving-wheel; I, the upper beveled driving-wheel; J, the spindle upon which the gears H and I revolve; K, the beveled pinion which gears with the wheels H and I for the purpose of revolving the drill-cable; L, the head-block for the drill-cable to revolve in; M, the tip-down set jaws or clamps; N, the tip-down bracket-lever; O, the set-screw for the tip-down clamp; Z, the female screw-sleeve for the tip down clamp; P, the sleeve for the adjustable combined post and spindle J and J' to operate in.

Q represents the lock pin or key for locking the sleeve P fast.

R represents the fixed cone bearings on the spindle J and J'.

R' represents the movable cone-bearing on the spindle J.

S represents the adjusting screw for raising and lowering the spindle J and J'.

T represents the guide-slot for the pin U.

U represents the pin attached to the spindle J and J', to operate in the slot T and prevent the spindle J and J' from turning in the sleeve P horizontally.

V represents the thumb-piece for turning the screw S.

W represents the guide-slot for allowing the extension-arm B to be moved out and in.

X represents the set screw for setting the extension-arm fast by means of the button Y.

Z represents the sleeve, which serves as a journal for the tip-down and a screw for clamping the set-jaws M, to loosen and allow the cable-rod to be tipped down to a vertical position, and when tipped up to a horizontal position to set the same fast by turning the thumb-piece O, which is attached to the same.

Y' represents the shank of the set-button Y, to operate in the guide-slot W.

E' represents the rubber facing for the bevel-gear.

The following is the construction of my improved dental engine: I construct the same of the same metals usually employed in the construction of that class of machinery, and face the beveled gear with india-rubber by applying about in the form shown in Fig. 2. I connect the extension-arm B by sliding it into the crane-arm A. The slot W slides along upon the shank of the button Y, and when at the point where the required extension is reached it is set fast by the set-screw X. I form the sleeve P so as to pass down through the crane-arm extension B, and I secure it by means of the pin or key Q. I construct the lower end large enough to form the female screw to receive the screw S. I pass the screw S down through the sleeve P until its lower shoulder rests upon the bottom of the said sleeve and the shank passes the thumb-piece V, which I firmly attach to the same. I then turn the screw S and draw the spindle J and J' until the required point is reached. I form the clamping-jaws M with sufficient spring to open out from the tip-down bracket N and allow the drill-cable to be tipped down, and when raised to be set fast at the required position.

The following is the operation of my improved dental engine: The length of the crane-arm is regulated as required by means of the slot W, the set-screw X, and button Y, and the adjustment of the extension-arm B. It will be seen that the arm B is moved out or in the slot W, passing the shank Y' of the button Y, until the arm is sufficiently extended or shortened. The set-screw X is then set fast. The pinion K is then placed in gear with the wheel H, as shown in Fig. 1. If the gear be too loose, then the adjusting-screw S is operated by the thumb-piece V, raising the wheel H against the pinion K, as may be required. The cord F gives motion to the wheel H by means of the pulley G, and consequently revolves the pinion K. When the pinion K is required to revolve in an opposite direction, the screw S is again operated to withdraw the spindle J and J' and bring the wheel I in contact with the upper side of the pinion K, thereby revolving the same in an opposite direction from that given by the contact with the wheel H.

When the machine is not required to be operated, the cable is tipped down to a vertical position by loosening the jaws M, which open sufficiently to allow the same to revolve freely upon the sleeve-journal Z until the drill-cable reaches the vertical position, as required.

In Fig. 3 I have shown the raising and lowering device, which serves to regulate the contact of the gear and to reverse the same, consisting of the sleeve P, with slot T, the part J', with pin U, the screw S, and thumb-piece V, except that the sleeve P is attached directly to the bracket N, and the part J' is attached to tip-down for the purpose of raising and lowering the pinion K, instead of the spindle J, so that the pinion K may be brought into gear with either the wheel H or the wheel I, for the purpose of reversing the motion, as is well understood.

Having thus described my invention, what I claim, and desire to secure by Letters Patent, is—

1. In combination with the crane-arm of a dental engine, the gear G, H, I, and K, by means of the sleeve P, slot T, spindle J and J', pin U, screw S, thumb-piece V, cone-bearings R and R', and the bracket N, jaws M, set-screw O, the sleeve-bearing Z, and the head-block L, for the purpose of reversing the gear and adjusting the same, constructed and operated substantially as and for the purposes set forth.

2. In combination with the head-block L, the jaws M, set-screw O, sleeve-bearing Z, and bracket N, for the purpose of adjusting the pinion K at any required point, constructed and operated substantially as and for the purposes set forth.

WILLIAM A. KNOWLES.

Witnesses:
 JOHN H. REDSTONE,
 L. E. REDSTONE.